United States Patent
Kozlov et al.

(10) Patent No.: US 10,297,065 B2
(45) Date of Patent: May 21, 2019

(54) METHODS AND SYSTEMS OF ENRICHING BLENDSHAPE RIGS WITH PHYSICAL SIMULATION

(71) Applicant: Disney Enterprises, Inc., Burbank, CA (US)

(72) Inventors: Yeara Kozlov, Zürich (CH); Bernhard Thomaszewski, Zürich (CH); Thabo Beeler, Zürich (CH); Derek Bradley, Zürich (CH); Moritz Bächer, Zürich (CH); Markus Gross, Zürich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 114 days.

(21) Appl. No.: 15/347,296

(22) Filed: Nov. 9, 2016

(65) Prior Publication Data
US 2018/0130245 A1 May 10, 2018

(51) Int. Cl.
*G06T 13/40* (2011.01)
(52) U.S. Cl.
CPC .................. *G06T 13/40* (2013.01)
(58) Field of Classification Search
None
See application file for complete search history.

(56) References Cited

U.S. PATENT DOCUMENTS

2017/0294041 A1* 10/2017 Kaufman ............... G06T 13/80
2018/0033190 A1* 2/2018 Ma ........................ G06T 15/503

OTHER PUBLICATIONS

Barbarino et al., "Physically based finite element model of the face", LNCS, 2008, pp. 1-10.
Barrielle et al., "Blend-forces: A dynamic framework for facial animation", Eurographics, 2016.
Beeler et al., "High-quality passive facial performance capture using anchor frames.", ACM Trans. Graphics (Proc. SIGGRAPH) 30, 2011, pp. 75:1-75:10.
Bergou et al., "Tracks: Toward directable thin shells", ACM Trans Graph, vol. 26, No. 3, Jul. 2007.

(Continued)

*Primary Examiner* — Nurun N Flora
(74) *Attorney, Agent, or Firm* — Kilpatrick Townsend & Stockton LLP

(57) ABSTRACT

Methods, systems, and computer-readable memory are provided for determining time-varying anatomical and physiological tissue characteristics of an animation rig. For example, shape and material properties are defined for a plurality of sample configurations of the animation rig. The shape and material properties are associated with the plurality of sample configurations. An animation of the animation rig is obtained, and one or more configurations of the animation rig are determined for one or more frames of the animation. The determined one or more configurations include shape and material properties, and are determined using one or more sample configurations of the animation rig. A simulation of the animation rig is performed using the determined one or more configurations. Performing the simulation includes computing physical effects for addition to the animation of the animation rig.

16 Claims, 13 Drawing Sheets
(3 of 13 Drawing Sheet(s) Filed in Color)

(56) References Cited

OTHER PUBLICATIONS

Bradley et al., "High resolution passive facial performance capture.", ACM Trans. Graphics (Proc. SIGGRAPH) vol. 29 Article 41, 2010, pp. 1-10.
Cong et al., "Fully automatic generation of anatomical face simulation models", In Proc. SCA, 2015, pp. 175-183.
Coros et al., "Deformable objects alive", ACM Trans Graphics (Proc. SIGGRAPH) 31, 4 Article 69, Jul. 2012, pp. 1-9.
Fan et al., "Active volumetric musculoskeletal systems", ACM Trans Graph 33, 4 Article 152, Jul. 2014, pp. 1-9.
Fyffe et al., "Driving high-resolution facial scans with video performance capture.", ACM Trans. Graphics 34, 1, 2014, pp. 1-14.
Hahn et al., "Efficient simulation of secondary motion in rig-space", Proceedings of the ACM SIGGRAPH/Eurographics Symposium on Computer Animation, 2013.
Hahn et al., "Rig-space physics", ACM Trans. Graphics (Proc. SIGGRAPH) 31, 4, 72, 2012.
Kahler et al., "Geometry-based muscle modeling for facial animation", Graphics Interface vol. 2001, 2001.
Klaudiny et al., "High detail 3D capture and non-sequential alignment of facial performance", 3DIMPVT, 2012, 12 pages.
Kondo et al., "Directable animation of elastic objects", Proc. SCA, 2005, pp. 127-134.
Lee et al., "Realistic modeling for facial animation", SIGGRAPH '95, 1995.
Lewis et al., "Practice and Theory of Blendshape Facial Models", EG 2014—State of the Art Reports, 2014.
Ma et al., "A blendshape model that incorporates physical interaction", Computer Animation and Virtual Worlds 23, May 3-4, 2012, pp. 235-243.
Martin et al., "Example-based elastic materials", ACM Trans. Graph. vol. 30 4, 2011.
McAdams et al., "Efficient elasticity for character skinning with contact and collisions", ACM Trans. Graph. 30, 4, Article 37, Jul. 2011, pp. 1-12.
Mithraratne et al., "An efficient heterogeneous continuum model to simulate active contraction of facial soft tissue structures", Proc. IFMBE, 2010.
Nocedal et al., "Numerical Optimization", 2nd ed. Springer, New York, Chap. 10, 2006.
Picinbono et al., "Non-linear anisotropic elasticity for real-time surgery simulation", Graphical Models 65, 5, Mar. 2003, pp. 305-321.
Rohrle et al., "Three-dimensional finite element modelling of muscle forces during mastication", J. Biomech 40, 15, 2007.
Schuller et al., "Locally injective mappings", Computer Graphics Forum (proceedings of EUROGRAPHICS/ACM SIGGRAPH Symposium on Geometry Processing) vol. 32 No. 5, 2013, pp. 125-135.
Si et al., "Tetgen—A quality tetrahedral mesh generator and three-dimensional delaunay triangulator", Weierstrass Institute for Applied Analysis and Stochastic, Berlin, Germany, Jan. 2006.
Sifakis et al., "Automatic determination of facial muscle activations from sparse motion capture marker data", ACM Trans. Graphics vol. 24, 2005, pp. 417-425.
Sorkine et al., "Laplacian surface editing", In Proceedings of the EUROGRAPHICS/ACM SIGGRAPH Symposium on Geometry Processing, ACM Press, 2004, pp. 179-188.
Terzopoulos et al., "Physically-based facial modeling, analysis and animation", J. of Vis. and Comput. Anim. 1, 2, 1990, pp. 73-80.
Warburton et al., "Physically-based forehead animation including wrinkles", Comput. Animat. Virtual Worlds, 2015, pp. 55-68.
You et al., "Adaptive physics-inspired facial animation", In Motion in Games, 2009, pp. 207-218.
Zhou et al., "Large mesh deformation using the volumetric graph laplacian", ACM SIGGRAPH 2005 Papers, ACM, New York, NY, USA, SIGGRAPH '05, 2005, pp. 496-503.

* cited by examiner

METHODS AND SYSTEMS OF ENRICHING BLENDSHAPE RIGS WITH PHYSICAL SIMULATION

FIELD

The present disclosure generally relates to enriching blendshape rigs with physical effects. For example, a blendshape rig can be enhanced by introducing a volumetric mesh and material parameters to the blendshape rig.

BACKGROUND

Whether stunningly realistic or artistically stylized, high-quality facial animation is a pivotal element for providing compelling characters in contemporary filmmaking. An important part of providing a believable digital performance is the consistency between the primary motion of the head and the secondary motion of the facial tissue that is induced by the head motion. While even subtle dynamics during speech can add greatly to the realism of an animation, secondary motion cannot be neglected for performances involving running, jumping, and other forms of rapid motion. The difficulty of combining artist-directed animation with physics-based simulation has so far prevented the widespread use of simulation for facial animation.

SUMMARY

Techniques and systems are described for enriching blendshape rigs with dynamic physical simulation to provide physical effects. Physical effects can include secondary motion, such as motion of tissue caused by motion of a body part (e.g., cheek tissue moving up and down as a person performs a fast up-down running motion). A layer of physical simulation can be added on top of an input animation sequence (e.g., including a blendshape animation). For example, using input blendshapes and, in some examples, bone meshes (e.g., a skull and jawbone), a volumetric mesh can be generated that includes a plurality of blend elements. The volumetric mesh can define a volume between a surface of the object and the bone meshes of the object. A blend-volume basis of the volumetric mesh can be created with direct shape correspondence with the blendshape subspace. The physical simulation can be performed on the volumetric mesh. In some examples, the volumetric mesh can be referred to herein as blend-volume rig.

In some examples, the physical simulation of the volumetric mesh can be performed using shape-dependent material parameters. For example, spatially-varying per-expression material parameters can be determined and can make up a blend material rig. The material parameters define physical characteristics of the blendshapes. For example, a combination of blend materials can define tissue stiffness of a person's face as the person performs a facial expression. The blendshapes, the bone meshes (if used), the volumetric mesh with the blend elements, and the material parameters make up a physical model. One example of a physical model is a face model for defining facial expressions with physical effects.

In some examples, a rest shape update process can be performed that allows for small or large shape changes without inducing unwanted dynamic effects. A rest shape includes a shape of an object when it is not deformed or under forces. For example, the rest shape of the physical simulation can be changed, such as on a per-frame basis, but without inducing spurious dynamic effects. In some cases, a dynamic rebalancing process can be performed to solve for a position of the physical model that agrees with forces observed before the material and shape of the model were changed. The resulting dynamics from the physical simulation can then be transferred back to the input animation sequence to enhance the animation with the physical effects.

By combining physics-based simulation with time-varying rest shapes and per-pose material properties, a powerful tool is provided for creating natural and controllable expression dynamics (e.g., facial dynamics). For example, the techniques and system can add dynamic motion when commanded by external forces or head motion, but in the absence of such effects, the output will correspond exactly to the input animation.

According to at least one example, a computer-implemented method of determining time-varying anatomical and physiological tissue characteristics of an animation rig is provided that includes defining shape and material properties for a plurality of sample configurations of the animation rig. The method further includes associating the shape and material properties with the plurality of sample configurations. The method further includes obtaining an animation of the animation rig. The method further includes determining one or more configurations of the animation rig for one or more frames of the animation. The determined one or more configurations include shape and material properties. The one or more configurations are determined using one or more sample configurations of the animation rig. The method further includes performing a simulation of the animation rig using the determined one or more configurations. Performing the simulation includes computing physical effects for addition to the animation of the animation rig.

In some examples, a system is provided for determining time-varying anatomical and physiological tissue characteristics of an animation rig. The system includes a memory storing a plurality of instructions and one or more processors. The one or more processors are configurable to: define shape and material properties for a plurality of sample configurations of the animation rig; associate the shape and material properties with the plurality of sample configurations; obtain an animation of the animation rig; determine one or more configurations of the animation rig for one or more frames of the animation, the determined one or more configurations including shape and material properties, wherein the one or more configurations are determined using one or more sample configurations of the animation rig; and perform a simulation of the animation rig using the determined one or more configurations, wherein performing the simulation includes computing physical effects for addition to the animation of the animation rig.

In some examples, a computer-readable memory storing a plurality of instructions executable by one or more processors may be provided. The plurality of instructions comprise instructions that cause the one or more processors to: define shape and material properties for a plurality of sample configurations of the animation rig; associate the shape and material properties with the plurality of sample configurations; obtain an animation of the animation rig; determine one or more configurations of the animation rig for one or more frames of the animation, the determined one or more configurations including shape and material properties, wherein the one or more configurations are determined using one or more sample configurations of the animation rig; and perform a simulation of the animation rig using the determined one or more configurations, wherein performing the simulation includes computing physical effects for addition to the animation of the animation rig.

In some aspects, the method, system, and computer-readable memory described above may further include changing, at each frame of the animation, a rest state configuration for the simulation to be an interpolation of a corresponding configuration determined for each frame.

In some aspects, the method, system, and computer-readable memory described above may further include performing dynamic rebalancing to prevent changing rest state configurations from affecting the simulation. In some examples, performing the dynamic rebalancing for a frame includes: determining a force associated with one or more shapes of the animation rig for the frame, wherein the force is determined before a rest state configuration of the simulation is changed at the frame; and determining, for the frame, a configuration that satisfies the determined force.

In some aspects, the animation rig includes a blendshape rig, and the plurality of sample configurations correspond to a blendshape basis.

In some aspects, the animation rig includes a blendvolume rig, and the blendvolume rig includes a plurality of blendvolumes defining volumetric structures for complementing the blendshape rig.

In some aspects, computing the physical effects includes: determining a blendvolume of the blendvolume rig for a configuration of the animation rig, the blendvolume comprising a combination of blend elements defining a volumetric structure of the configuration; and determining one or more material properties of the configuration.

In some aspects, the plurality of blendvolumes are generated by deforming a neutral blendvolume to each of a plurality of blendshapes. In some examples, the neutral blendvolume is generated by tesselating a neutral blendshape.

In some aspects, the method, system, and computer-readable memory described above may further include adding the shape and material properties of the determined one or more configurations to the animation of the animation rig.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Figure 1:
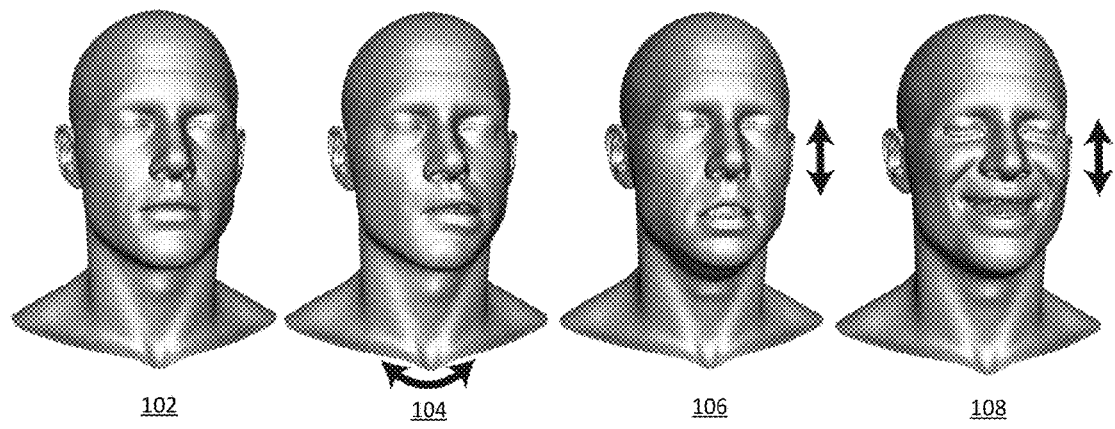
FIG. 1 illustrates a computer-generated face with a neutral expression undergoing rapid side-to-side head motion and fast up-down running motion, and the face with a smile expression undergoing the up-down running motion.

Animated works, such as movies, games, virtual reality, and other animated content, have become ubiquitous in the entertainment industry. Whether stunningly realistic or artistically stylized, high-quality facial animation is a key element for providing compelling characters in contemporary filmmaking and other animated production. A central requirement for a believable digital performance is the consistency between the primary motion of the head and the secondary motion of the facial tissue that the head motion induces. FIG. 1 illustrates a computer-generated face with a neutral expression 102 undergoing rapid side-to-side head motion and fast up-down running motion. In FIG. 1, the computer-generated face is illustrated with expression 104, including a neutral expression while undergoing side-to-side head motion. The computer-generated face is further illustrated with expressions 106, including the neutral expression while undergoing a fast up-down running motion. The additional secondary dynamics are visible especially in the lip region. Additionally, the computer-generated face is illustrated with a smile expression 108 while undergoing the same running motion, where the secondary effect is much more subtle due to the stiffened tissue caused by the smile expression (shown on the far right). The same type of primary and secondary motion applies to other body parts.

While even subtle dynamics during speech can add greatly to the realism of an animation, secondary motion cannot be neglected for performances involving running, jumping, and other forms of rapid motion.

Animating secondary motion is generally a challenging and tedious task if done manually. The process can be automated using physical simulation. For facial animation, a detailed anatomical model of the human face can be used as a basis for simulation. While this approach can faithfully reproduce facial dynamics, at least two limitations hinder its adoption in production environments. First, creating the anatomical model with its numerous muscles, tendons, and other tissue components is a manual and exceedingly labor-intensive process. Second, anatomically-based simulation rigs are controlled through muscle activations. Compared to the commonly used blendshape rigs, this type of control is indirect, unintuitive, and difficult to integrate into existing animation workflows.

An alternative approach is to start from an artist-created blendshape animation, which is then used as a target for physics-based simulation. By interpolating forces instead of geometry, it is possible to extend the expressive range of blendshape rigs and, at the same time, automatically handle lip contacts. However, the underlying shell-based simulation model is too crude an approximation to faithfully reproduce secondary motion in soft tissue.

In summary, the difficulty of combining artist-directed animation with physics-based simulation has so far prevented the widespread use of simulation for facial animation.

In order to bridge this gap, systems and methods are described herein that combine the benefits of physics-based simulation for creating secondary motion while maintaining the ease of control offered by blendshape rigs. Rather than a detailed anatomical model, the systems and methods described herein rely on a volumetric mesh for physical simulation. In contrast to conventional simulation, however, a rest state mesh is adapted according to the artist-provided blend-shape animation. Adapting the rest state of the volumetric mesh of an object ensures that, in the absence of external forces (e.g., head motion, gravity, external physical movement of the object, or other external forces), the equilibrium states of the simulation coincide with the artist-defined blendshape poses. Furthermore, in order to achieve natural dynamics in the presence of head motion or other forces, the systems and methods allow per-pose material parameters to be defined or determined for the simulation mesh. By defining material parameters (also referred to herein as "material properties"), two central properties are captured by the systems and methods described herein. First, owing to the anatomical complexity of the face or other portion of an object, different regions exhibit largely different material properties, ranging from soft fat tissue to quasi-rigid bones. Second, the material properties change as a function of deformations of different expressions. As one illustrative example, muscle tissues stiffen when contracted, while the muscle tissues become less stiff as they relax.

In some examples, the methods and systems described herein enrich facial blendshape rigs with physical effects such as secondary motion. For example, simple Finite Element (FE) volume meshes can be used for simulation. By using physical simulation, the complexity and set up time of muscle-based anatomical models is reduced. The dynamic simulation can be performed alongside an artist-created blendshape animation, and the dynamics can then be transferred back to the blendshape animation. As noted above, the rest shape configurations can be adapted during dynamic simulations. Such a change in rest shape configurations allows the system to handle large deformations during simulation and helps to ensure that the equilibrium state of the physical simulations coincide with the artist-provided blendshape animation. The rest shape of the simulation is changed without inducing spurious dynamic effects. For example, rather than generating control forces with the goal of creating dynamic motion, the systems and methods control the rest state in order to conform with the artist-provided blendshape animation (e.g., dynamic effects in the facial tissue are induced by head motion or other external forces). As a result, dynamic motion is only added when commanded by external forces or head motion, but in the absence of such effects, the output will correspond to the input animation.

Also as noted above and because activated muscles stiffen the soft tissue, the systems and methods described herein introduce expression-dependent, spatially-varying "blend materials" by defining material properties for different expressions. In some examples, the system can enable artist control over the blend materials through an intuitive paint interface. In some cases, the methods and systems contact and collision handling with skull surfaces is provided as an integral component of the process. As described further below, the enrichment method is demonstrated on a compelling set of faces of realistic and fantasy characters, providing an illustration of the intuitive artistic control and ease of integration in conventional production pipelines of contemporary filmmaking and other production of animated works.

Combining physics-based simulation with time-varying rest shapes and per-pose material properties provides a powerful tool for creating natural and controllable feature dynamics (e.g., facial dynamics). As shown in the results provided below, the systems and methods provided herein can enrich blendshape animations with physics-based dynamic effects for a broad range of characters, including digital human actors as well as fantasy creatures. Moreover, experiments are used to indicate that it advantageous to control material properties both spatially and temporally in order to faithfully capture facial dynamics with a simplified simulation model. Thanks to its simplicity, setting up the simulation rigs is a lightweight process that requires only a few additional steps compared to standard animation workflows. For example, per-pose material properties can be defined using existing tools for shape or texture control (e.g., by painting the material properties using a graphical interface).

Various animation techniques have been used. For example, several approaches can be used for creating facial animation, including performance capture, blendshape animation, and anatomical models that rely on physics. Performance capture methods can directly capture the animation including all the physical effects that occur, but they do not allow easy editing of the animation. Blendshape animation is a common technique. However, there are drawbacks to blendshape animation. For example, simple linear interpolation of the blendshapes for an expression does not handle rotational deformations, self-collisions, physical interaction with external objects, or secondary motion caused by dynamics. With the goal of improving flexibility and increasing realism, anatomical approaches that directly model facial muscles have also been proposed. These techniques can simulate all the desired dynamic effects, but are extremely difficult and time-consuming to set up. This is why some researchers have focused on only small parts of the face, such as the forehead or cheek region. With a similar motivation, other works have investigated automatic initialization and anatomy transfer.

The systems and methods described herein extend blendshape animation by adding a layer of physical simulation to account for secondary dynamics, self-collision, and interaction with external objects. The techniques performed by such systems and methods are transparent to artists, animators, and other animation personnel, in the sense that they use blendshape animation sequences in order to automatically add physical effects.

Some techniques attempt to combine blendshape animation and physics-based simulation. For example, a mass-spring system may be used on top of blendshapes, with goals of allowing interaction between external objects and better handling of rotational deformations. A physical model of skin deformation can also be added to blendshape animation for blending forces rather than shapes, such that the resulting facial animation can more closely follow the underlying physical properties. Further, techniques may optimize for blendforces to achieve animations that go beyond the linear span of the blend-shape basis and automatically incorporate deformations due to, for example, lip contacts. Unlike such techniques, the systems and methods described herein are able to automatically prevent self-collisions and respond to contact, and in addition, can reproduce secondary dynamics in the tissue (e.g., facial tissue) in a natural, yet controllable way. Therefore, surface-based models are not used, and instead finite element simulation are performed on volumetric meshes, whose rest state and material properties are controlled (e.g., automatically or by an artist) in order to achieve the desired effects.

Figure 2:
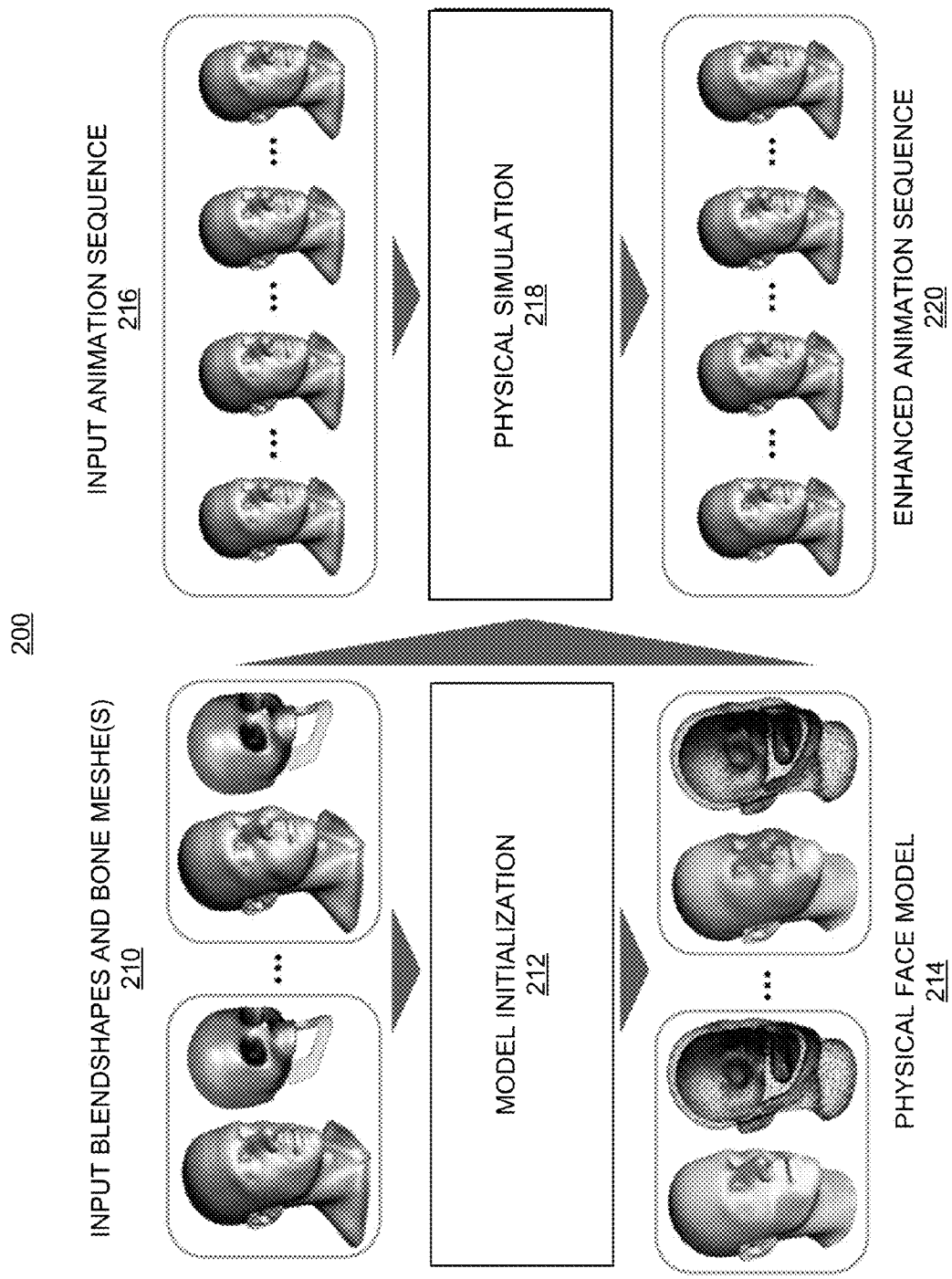
FIG. 2 illustrates an example of a process of adding physical simulation to an input blendshape animation sequence, in accordance with some examples.
Figure 3:
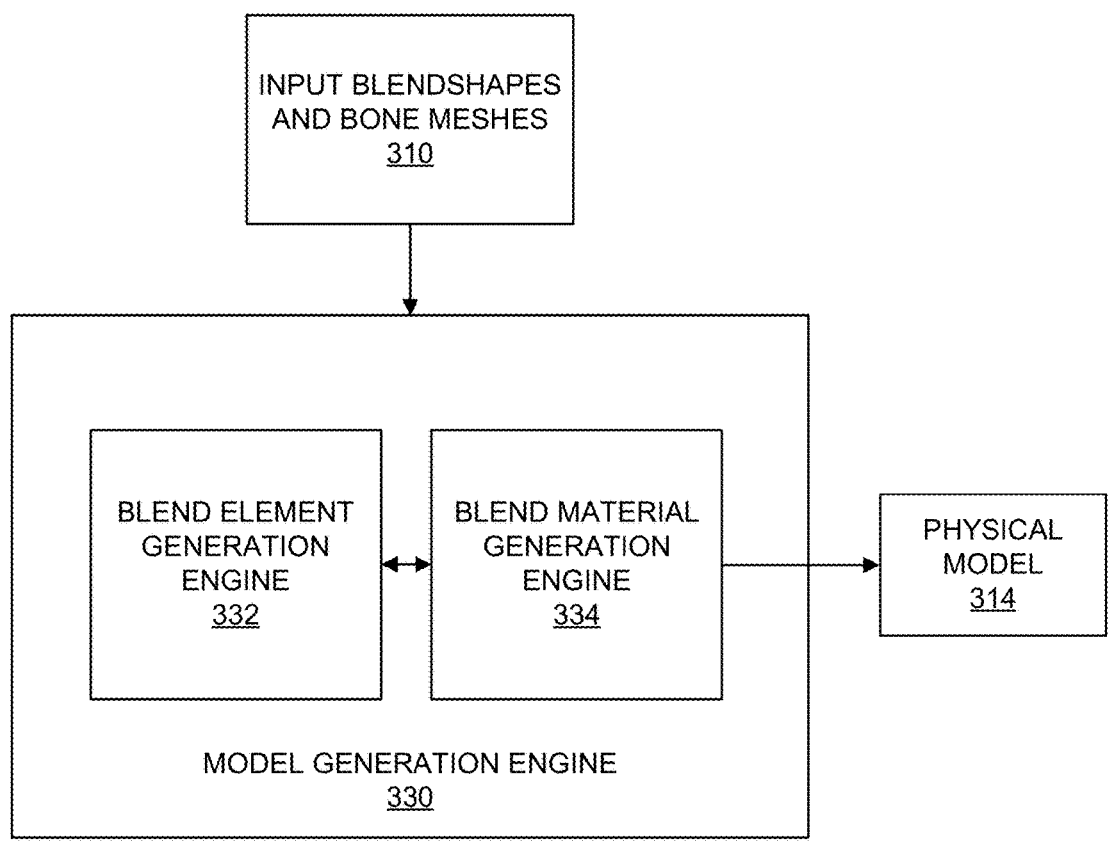
FIG. 3 illustrates an example of a model generation engine, in accordance with some examples.

As previously described, systems and techniques described herein enhance blendshape animations with physical effects, such as secondary motion caused by dynamics. FIG. 2 illustrates an example of a process 200 of adding physical simulation to an input blendshape animation sequence. Model initialization 212 can include building a physical face model 214 (including a "blendvolume" rig and "blend material rig," described below) from a set of input blendshapes and corresponding bone meshes 210 (e.g., skull and jaw bones). The physical face model 214 can be used to augment an input animation sequence 216 with physical effects, such as secondary dynamics. The physical face model 214 of an object is only one example of a physical model generated and used according to the methods and systems described herein. The face model 214 can be used for modeling facial expressions of a human or other character in an animation. Model initialization 212 techniques are described below for initializing a face model, including the creation of the blendvolume rig and the blend material rig. FIG. 3 illustrates an example of a model generation engine 330. Model initialization 212 can be performed by the model generation engine 330 to build a physical face model 314 from a set of input blendshapes and corresponding bone meshes 310. While techniques described herein use the face model 214 as an example, one of ordinary skill will appreciate that the same techniques can be applied to physical models of other objects or parts of objects, such other body parts of a person, non-living objects (e.g., a ball, a sword, or other object), an animal or portion thereof, or other object).

To add the physical effects, a layer of physical simulation is added on top of the blendshape animation 216. Complex muscle-based physical face models are not needed. Rather, a finite-element volumetric mesh is generated that models the layer of tissue beneath the skin surface. This volume is created to maintain direct shape correspondence with the blendshape subspace, defining a blendvolume rig. The blendvolumegeneration engine 332 can be used to generate the blendvolume rig. The blendvolume rig includes a plurality of blendvolumes. Each blendvolume corresponds to and is in shape correspondence with a corresponding blendshape of a plurality of blendshapes. A combination of the blendvolumes can be determined for an expression. The determined combination of blendvolumes defines a volumetric structure of the expression. Furthermore, spatially-varying per-expression material parameters are defined by generating a blend material rig that can account for physical phenomena such as tissue stiffening when muscles contract. The blend material generation engine 334 can be used to generate the blend material rig. The blend material rig includes material parameters that are defined for the blend shapes. For example, a material parameter can define a stiffness of a blend shape. The blendshapes, bone meshes (if used), the volumetric mesh with the blendvolumes, and the material parameters are included in the physical model (e.g., the physical face model 214 or 314).

Figure 4:
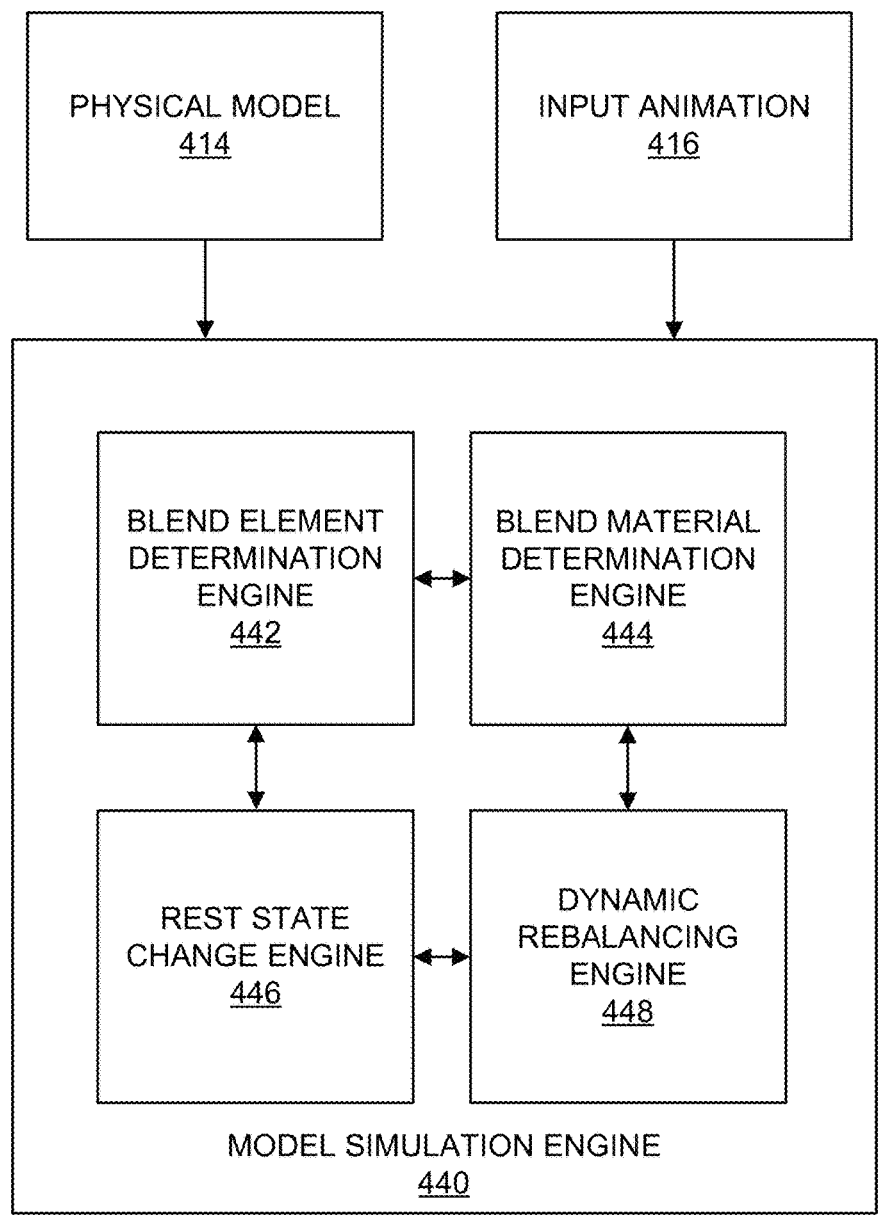
FIG. 4 illustrates an example of a model simulation engine, in accordance with some examples.

FIG. 4 illustrates an example of a model simulation engine 400 that can perform the physical simulation 218. For example, given an input blendshape animation 416, the model simulation engine 400 can enrich the motion by adding the physical effects (e.g., secondary dynamics) using the physical face model 414. This can be accomplished by performing a dynamic physical simulation 218 of the element volume (e.g., the volumetric mesh) using shape-dependent material parameters determined by the blend material determination engine 444 and a novel per-frame rest shape update approach performed by the rest state change engine 446. The rest shape update allows for large shape changes without inducing unwanted dynamic effects. The blendvolume determination engine 442 can determine the combination of blendvolumes of the volumetric mesh for the simulation. In some examples, a dynamic rebalancing engine 448 can perform dynamic rebalancing to determine a configuration of the physical model 414 that agrees with forces observed before the material and shape of the model 414 were changed. The resulting dynamics are transferred back to the original sequence, enhancing the animation to generate an enhanced animation sequence 220.

As noted above, the physical face model includes a blendvolumes rig and a blend material rig. The physical simulation 218 can include performing a finite-element based simulation to compute secondary dynamics in facial tissue. The geometric complexity of anatomical models and the corresponding setup times are avoided by using a single volume mesh for all of the facial soft tissue. In some examples, more than one volume mesh could be used for the facial tissue of an object. In order to capture the salient properties of muscles and other soft tissue with the volume mesh-based model, time-varying rest states and spatio-temporally varying material properties are provided. Aside from being convenient in terms of setup and artistic control, the physical model draws on insights from anatomy, including that changes in rest shape approximate the effect of muscle activation, while changes in material properties account for the stiffening of living tissue with increasing deformation. As explained below, the physical face model uses blendshape rigs as a basis, and interpolates both rest state geometry and material properties.

Figure 5A:
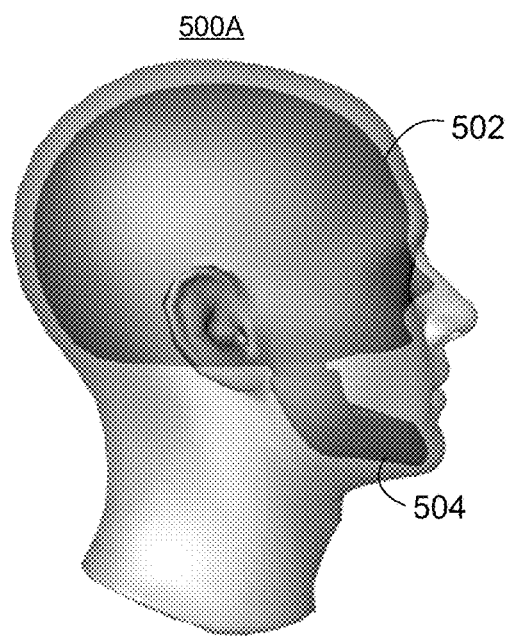
FIG. 5A illustrates a neutral shape with embedded skull and jaw meshes, in accordance with some examples.
Figure 5B:
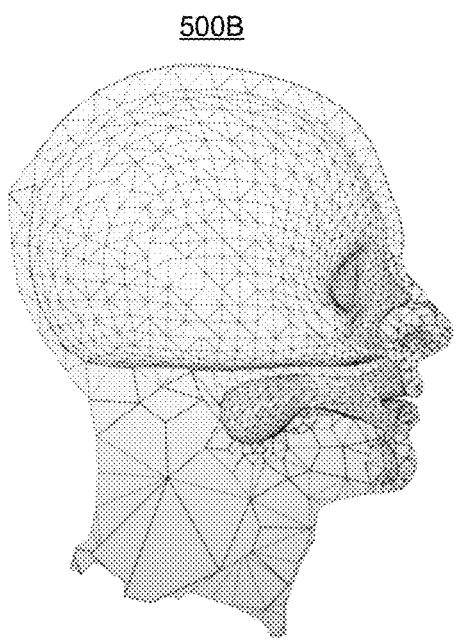
FIG. 5B illustrates a cross-sectional view of a corresponding tetrahedral volumetric mesh passing through a mouth cavity, in accordance with some examples.

FIG. 5A and FIG. 5B. show the components of the geometric model of the physical face model. FIG. 5A illustrates a neutral shape 500A with an embedded skull bone mesh 502 and an embedded jaw bone mesh 504. FIG.

5B illustrates a cross-sectional view of a corresponding tetrahedral volumetric mesh 500B passing through a mouth cavity. The geometric model includes the volumetric mesh. The volumetric mesh is part of the blendvolumes rig. As noted previously, the blendvolumes rig adds physical simulation to traditional blendshape rigs, by enriching them with a simple volumetric tissue structure. The blendvolumes rig can be used to add, for example, secondary effects caused by head motion to a blendshape animation. A blendshape rig is used as a basis, where poses S are created from linear combinations of base shapes $B_S$, which encode the relative displacements from the neutral shape $S_0$ as:

$$S = S_0 + B_S w, \quad \text{Equation (1)}$$

where w are blend weights. Blend weights w can increase or decrease an amount of a particular expression. In one illustrative example, with $S_0$ as a neutral pose, a combination of base shapes $B_s$ can create a character with a smile (e.g., a smile blendshape). The weights w can be increased or decreased to dial the smile from a large smile to a slight smile. For example, a weight value of 0.5 can create a half smile expression.

For physical simulation, the neutral shape (or surface shape) $S_0$ can be augmented with a volumetric mesh $X_0$ that represents the soft tissue underneath the surface shape. Analogously to the blendshape basis $B_S$ that encodes the shape variation of the surface shape, the volume variation of the soft tissue is encoded via a "blendvolumes" basis $B_X$. The blendvolumes basis $B_X$ encodes the nodal displacements relative to $X_0$. In this way, a pose-dependent rest state X of the soft tissue volumetric mesh is defined as:

$$X = X_0 + B_X w, \quad \text{Equation (2)}$$

The blend weights w can be the same for equations (1) and (2), or can be different. Details on how to construct the blendvolumes basis $B_X$ are given below. In addition to the soft tissue, the hard tissue (represented as bone meshes, such as skull and jaw bone meshes), can be provided as input.

The material properties of shapes can also be modeled by introducing blend materials to account for the effect of changing material properties as expressions change (e.g., a contracting muscle becomes stiffer). For example, when facial muscles are activated (e.g., the muscles are contracted), the soft tissue beneath the skin stiffens in those areas around which the facial muscles are located. In order to reproduce this effect in the physical face model, each blendshape is augmented with a blend material parameter P, defined as:

$$P = P_0 + B_P w_P \quad \text{Equation (3)}$$

where $P_0$ defines the per-element default material parameters, $B_P$ encodes the expression-specific parameter offsets from the default parameters $P_0$, and $w_P$ is a corresponding weight vector. Although not a requirement, the formulation can be simplified by assuming that the material changes linearly with shape (denoted as $w_P = w$). Such a simplification still produces good results in experiments.

Figure 6:
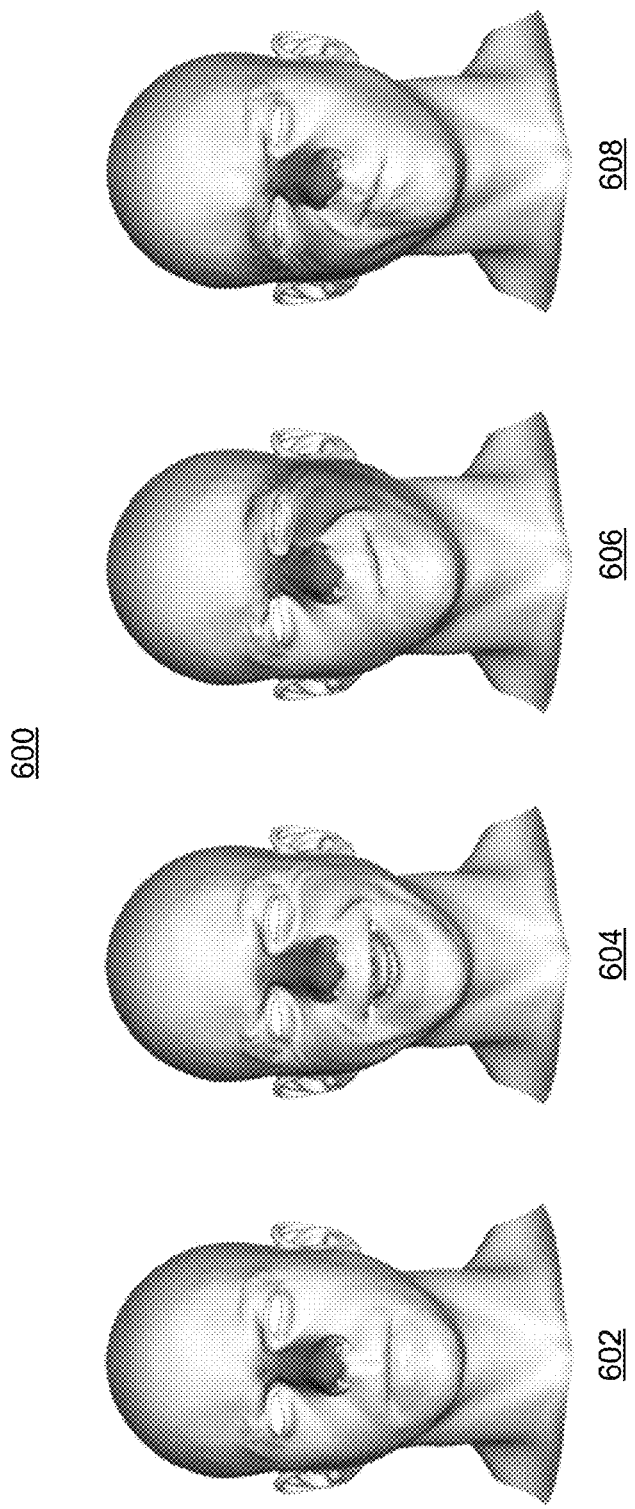
FIG. 6 illustrates faces with varying shape-dependent material properties according to the different expressions, in accordance with some examples.

FIG. 6 provides an illustration of shape-dependent material properties. The shaded portions of the various expressions 602-608 indicate areas of the face that have higher stiffness defined by corresponding material parameter offsets ($B_p w_p$) for those areas, as compared to the default material parameters $P_0$ for the face. For example, the face expression 602 shows the character with a neutral expression having the default material parameters and a stiff nose region. The face expression 604 shows the character with a smile expression, in which case the cheek and chin regions have a higher stiffness than the default material parameters for those regions. As shown in the expression 604 by the lighter shading on the cheek and chin regions as compared to the nose region, the cheek and chin regions are less stiff than the nose region. The face expression 606 includes the character squinting on the left side, in which case the material parameters for the left cheek and eye regions are defined as stiff, with those regions having a stiffness level slightly lower than the stiffness of the nose region. Similarly, the expression 608 includes the character squinting on the right side, with material parameters being defined for the right cheek and eye regions with a stiffness level slightly lower than the stiffness of the nose region.

Referring again to FIG. 3, the model generation engine 330 can generate the physical model by performing a model initialization process. Looking first at the geometry, the blendvolume generation engine 332 generates a blendvolume basis $B_X$. The blendvolume generation engine 332 can take a neutral mesh $S_0$ as input, along with a blend-shape basis $B_S$ with corresponding skull and per-shape jaw bone meshes. In order to create the finite element volumetric mesh $X_0$ (the neutral volume), the blendvolume generation engine 332 tetrahedralizes the neutral shape $S_0$, filling the space between the outer surface and the bone meshes. The resulting volumetric mesh $X_0$ includes a plurality of tetrahedron (also referred to as "blend elements") that can be manipulated to define a volumetric structure. In some examples, for the neutral mesh, a tetrahedralization algorithm can be used to tetrahedralize the neutral shape $S_0$. One illustrative example of a tetrahedralization algorithm includes TetGen. The blendvolume basis creation described herein is used to take the volume resulting from the tetrahedralization and to adapt it to each blend shape.

In order to enrich animations created on the blendshape rig with a volume, a blendvolume rig $B_X$ is generated that is in direct shape correspondence with the blendshape rig $B_S$. To generate the blendvolume rig $B_X$, the blendvolume generation engine 332 deforms the neutral element mesh $X_0$ into each facial expression defined by $S_0 + B_s^i$, and stores the positional offsets as the columns of the blendvolume rig $B_X$. In some examples, each row of the blendvolume rig $B_X$ may correspond to one of the nodes of the model, and each column may correspond to one or more coordinates of each node in one or more of the axes (x, y, z). Several deformation approaches can be used to generate the per-expression element meshes. In one example, a volumetric Laplacian deformation can be performed. In some cases, Laplacian formulations may not prevent inversion of individual elements. Since the resulting element meshes will become a basis for generating simulation rest shapes, inversion-free configurations can be used. For example, physical simulation can be used to transfer the neutral volume to each of the facial expressions. Details of the physical simulation are described further below.

Directly simulating from the neutral rest shape $X_0$ into each expression pose is a challenging process, since, by definition, the blendshapes are the extremal poses of the shape space. For robust deformation, the blendvolume generation engine 332 can compute the difference vectors $d_i$ between face surface and corresponding nodes of the neutral rest shape $X_0$, and incrementally stiffen a set of spring potentials in static solves of the following form:

$$f_{static}(X_n) = W(X_p, X_n, P_0) - \Sigma_i \tfrac{1}{2} k d_i^2, \quad \text{Equation (4)}$$

where the engine 332 initializes the previous rest shape $X_p$ with $X_0$, and updates $X_p$ with a current rest state $X_n$ after convergence of a static step. A rest state can also be referred to as a rest shape, a rest pose, or a rest configuration. A node of the volumetric mesh can include a node (or point) where two or more tetrahedrons (or "blend elements") connect. For example, a node may define a vertex of a blend element. A node can be used to discretely sample or represent a continuous object. The term $W(X_p, X_n, P_0)$ is the elastic energy of the deformed volumetric mesh, and is defined below with respect to physical simulation in equation (5). During this initial deformation, the blendvolume generation engine 332 can deliberately avoid calculating direct internal constraints for nodes that are adjacent to bones in order to allow the tissue to slide over the bones when appropriate, providing enough degrees of freedom to match the facial expression surface mesh exactly. In some examples, the engine 332 can deliberately reduce the volume preservation term P in Equation (6) below by setting $\lambda=100$, or other suitable number, for all static solves to allow for volume change where necessary due to muscle bulging. In some examples, weak volume preservation can be kept by setting $V(X)$ to $V(X_0)$ (see Equation (6) below) to safeguard against degenerate element configurations. Once converged, the element volumetric mesh conforms to the facial expression, but may not align internally with the bones. To obtain the final inversion-free expression configuration, these inner boundary nodes are projected to the closest surface point on the bone meshes (e.g., the skull and jawbone meshes), and then a second static solve with these additional constraints is performed using equation (4).

The blend material generation engine 334 can then generate the blend material basis. As previously mentioned, muscles can locally change the physical material properties of facial tissue, such as becoming stiffer when muscles tighten. For example, when a muscle stretches or compresses, it will change the material properties of the tissue surrounding the muscle (e.g., the tissue will become stiffer as the muscle contracts and will become more relaxed as the muscle relaxes). Very much like the change of a muscle changes the shape of the facial tissue (which is reflected in the blendshapes) and changes the underlying volume (which is reflected in the blendvolumes), the muscle change also changes the underlying material properties (which is reflected by the blend materials). In one illustrative example, if a sphere has a specific volume and is then changed to a flat object, the volume will change accordingly. At the same time, the flat object can either become very stiff (e.g., like wood) and may not move as it is comes under external forces (e.g., gravity), or it can become very flexible (e.g., like rubber) and may flop around as external forces are applied. The material property of the object can thus define the how the object will deform under external forces.

These material changes are very local, requiring a model that supports spatio-temporal changes in material parameters. The blend material generation engine 334 can encode the material changes in a blend material basis $B_P$, which is also in shape correspondence with the blendshape basis $B_S$. In some cases, the blend material basis $B_P$ is in perfect shape correspondence with the blendshape basis $B_S$.

Initializing per-shape spatially-varying material parameters, even for a simple volume, can be a very tedious task. In some examples, material properties can be input as values for different regions of an object (e.g., for a face, as shown in FIG. 6). For example, a 1 value can be input for the nose regions in expressions 602-608 (indicating that no movement of the nose tissue occurs when external forces are applied) and a 0.5 value can be input for the left cheek region for the blendshape shown in expression 606 5 (indicating for that blendshape that the left cheek region experiences half of the normal movement as compared to a default stiffness when external forces are applied). In some examples, material properties can be painted per blendshape on the surface of the mesh using an interface. For example, the material properties can be painted by an artist (e.g., using a graphical interface) either as a texture or directly on the mesh. This is very appealing to artists as they are used to working with shape dependent maps, such as albedo textures or normal maps. In such examples, the system allows complete artistic control over the expression-dependent material properties, by offering a simple and intuitive interface for painting properties on the blendshape mesh surfaces. As one example, for each expression, an artist is able to paint distinct regions (e.g. in different colors, different shades, different patterns, or any other way of differentiating material parameters for a region), and set parameters directly based on the painted regions. For example, for a particular blendshape, one region can be painted blue and another region can be painted red, and the red and blue colors can be defined to have a certain stiffness compared to a default stiffness (e.g., with the blue region being less stiff than the red region). In one illustrative example, a non-painted region can have a stiffness of 0, the blue region can have a stiffness of 0.5 (indicating half of the normal movement of the tissue as compared to a default stiffness when external forces are applied), and the red region can have a stiffness of 1 (indicating no movement of the tissue when external forces are applied).

These painted maps can then be propagated to the volumetric structure. For example, the heat equation can be solved on the volumetric element mesh to diffuse the parameters throughout the volume. Using the values applied to the surface of the model, the heat equation interpolates the values for the entire volume underneath the surface. For example, the steady state heat equation can be solved for. The heat equation is a type of partial differential equation, which describes how heat is propagated through a medium. Solutions to the heat equation have properties such as smoothness, and given a bounded domain and solving the heat equation on the interior, the solution is bound to be within the maximal and minimal values on the boundary of a domain.

The combination of temporally blending volume and material properties in the same way as blending a surface shape (using blendshapes) allows the addition of simulation to existing blendshape animations with minimal overhead. Both the rest shape X and material properties P can be interpolated during simulation without introducing spurious artifacts. Details are described herein to perform a blendshape driven simulation for correctly blending the volume and properties without adversely affecting simulation or animation. Using the physical face model described above, blendshape animations can be enriched with secondary motion and other physical effects. The simulation model is now described, followed by an explanation of how to incorporate spatio-temporal material and rest shape changes without inducing spurious dynamics.

The model simulation engine 440 can use an elastic potential for the physical simulation of the volume. For example, a standard finite element approach for simulating facial tissue can be used. As a point of departure, the model simulation engine 440 can compute the total elastic energy W of the facial tissue from elemental contributions U as:

$$W(X,x,P) = \Sigma_e U(X|_e, x|_e, P|_e), \quad \text{Equation (5)}$$

where x and X are the nodal positions (positions of the nodes) in the deformed and undeformed configurations of the volumetric mesh, respectively, and P are per-element material parameters. The elastic energy represents the internal forces of the object (e.g., if an object is stretched, the object will create a force to try to make the object go back to its rest state). The term $|_e$ is the restriction of vertices and parameters to the ones incident to a particular element e. It is important to note that every frame of the animation defines a different rest configuration X, which is computed as a linear combination of per-pose element meshes according to Equation (2). Similarly, every animation frame defines a different material configuration P, computed as a linear combination of per-pose materials according to Equation (3).

While many choices for the elastic potential U are compatible with the approach described herein, one example is an extended St. Venant-Kirchhoff material with an altered second term for better inversion recovery, in which case the following per-element energy is defined:

$$U(X, x, P) = \mu[tr(E(X, x))]^2 + \frac{\lambda}{2}\left(\frac{V(x)}{V(X)} - 1\right)^2, \quad \text{Equation (6)}$$

where $P=[\mu,\lambda]^T$ are the Lame constants that govern stiffness and volume preservation, $E=\frac{1}{2}(F^TF-1)$ denotes the Green strain tensor with deformation gradient $$F = \frac{\partial x}{\partial X},$$

V denotes the volume of a given configuration, and tr(•) is the trace operator.

Dynamic simulation is now described. The dynamics of the facial tissue are governed by Newton's second law of motion:

$$Ma+\nabla_x W(X,x,P)=f_{ext}, \quad \text{Equation (7)}$$

where M is the mass matrix and the term "a" collects all nodal accelerations. The mass matrix M is a matrix with the mass of each node or tetrahedron. In one illustrative example, the mass of every tetrahedron (or "blend element") can be computed (e.g., by computing density*volume) and distributed to its four vertices (a technique called mass lumping). In general, the simulation engine 440 will determine how an object (e.g., the volumetric mesh) can move over time by doing a physical simulation. In order to do this, the model simulation engine 440 will compute the velocities of every point of the object (the nodes of the volume). As noted above, the simulation is based on Newton's second law (force=mass×acceleration). There are external forces (e.g., gravity, physical movement of the object, among other external forces) as well as internal forces caused by elastic energy, as described above. The mass of an object is typically known and the velocity and acceleration can be determined, as shown by the equations below. The mass and acceleration can then be used to determine the forces ($f_{dynamic}$) on a node of the object at a next time step ($x_n$).

Assuming, for now, that the rest configuration X and the parameters P remain unchanged, the equations of motion can be integrated using, for example, the first-order implicit Euler scheme. To this end, the nodal velocities at the next time step (or current time step if p is previous) are expressed as:

$$v_n(x_n) = \frac{x_n - x_p}{h}, \quad \text{Equation (8)}$$

where $x_n$ and $x_p$ are nodal positions at the next (or current) and previous time step, respectively, and h denotes the time step size. In one illustrative example, the time step size h is each frame of a video sequence. Similarly, nodal accelerations are defined as:

$$a_n(x_n) = \frac{v_n(x_n) - v_p}{h} = \frac{x_n - x_p}{h^2} - \frac{v_p}{h}, \quad \text{Equation (9)}$$

resulting in a system of nonlinear equations:

$$Ma_n(x_n)+\nabla_x W(X,x_n,P)=f_{ext}, \quad \text{Equation (10)}$$

which can be solved for the unknown positions $x_n$. In practice, the blend shape determination engine 442 can minimize an equivalent dynamic objective function:

$$f_{dynamic}(x_n) = \frac{h^2}{2}a_n^T M a_n + W(X, x_n, P) - x_n^T f_{ext}, \quad \text{Equation (11)}$$

which assumes the external forces are conservative.

As noted previously, rest shape changes and material changes are utilized. For example, the approach relies on changes to the rest state and material properties of the simulation mesh in order to control the motion of the facial tissue. A rest shape (also referred to as a rest state, a rest configuration, or a rest pose) includes a shape of the volumetric mesh when it is not deformed or under any forces.

The full physical simulation is summarized as pseudo code in Algorithm 1:

```
Algorithm 1 Blendshape Driven Simulation

Require: Initial state x_n = X_p = X(0), P_p =
P(0), v_p = 0
1: while Simulating do
2:     Step time t = t + h
3:     Blend volumes X_n = X_0 + B_x w(t)
4:     Blend materials P_n = P_0 + B_p w(t)
5:     Solve x̃_n = argmin_x f_dynamic(x)
6:     Update velocities v_n(x̄_n) and accelerations
       a_n(x̄_n)
7:     Compute inertial forces f_inertial = Ma_n
8:     Solve x_n = argmin_x f_static(x).
9:     Step quantities X_p = X_n, P_p = P_n, x_p =
       x_n, v_p =
10: end while
```

As noted above, the terms $x_n$ and $x_p$ are nodal positions at the next (or current) and previous time step, respectively, and h denotes the time step size (e.g., a frame-by-frame time step). The term $X_n$ and $X_p$ are the rest shapes at the current and previous time steps, respectively, and the terms $P_n$ and $P_p$ are the material parameters at the current and previous time steps, respectively. The term $V_p$ is the initial velocity at the previous time step. The term x̃ is the intermediate position. The algorithm runs in a loop so that the steps of the algorithm are performed every time the system attempts to accomplish a time step (e.g., for every new frame), as denoted by step 2 ("Step time t=t+h").

The rest shape is implicitly updated for the current time step at step 8. For example, at step 8, blendvolumes are determined for the volumetric mesh $X_n$ using equation 1 above. For example, the blendvolume determination engine 442 can determine the blendvolumes. At step 4, material parameters $P_n$ are determined using equation 2 above. For example, the blend material determination engine 444 can determine the blend materials.

Figure 7:
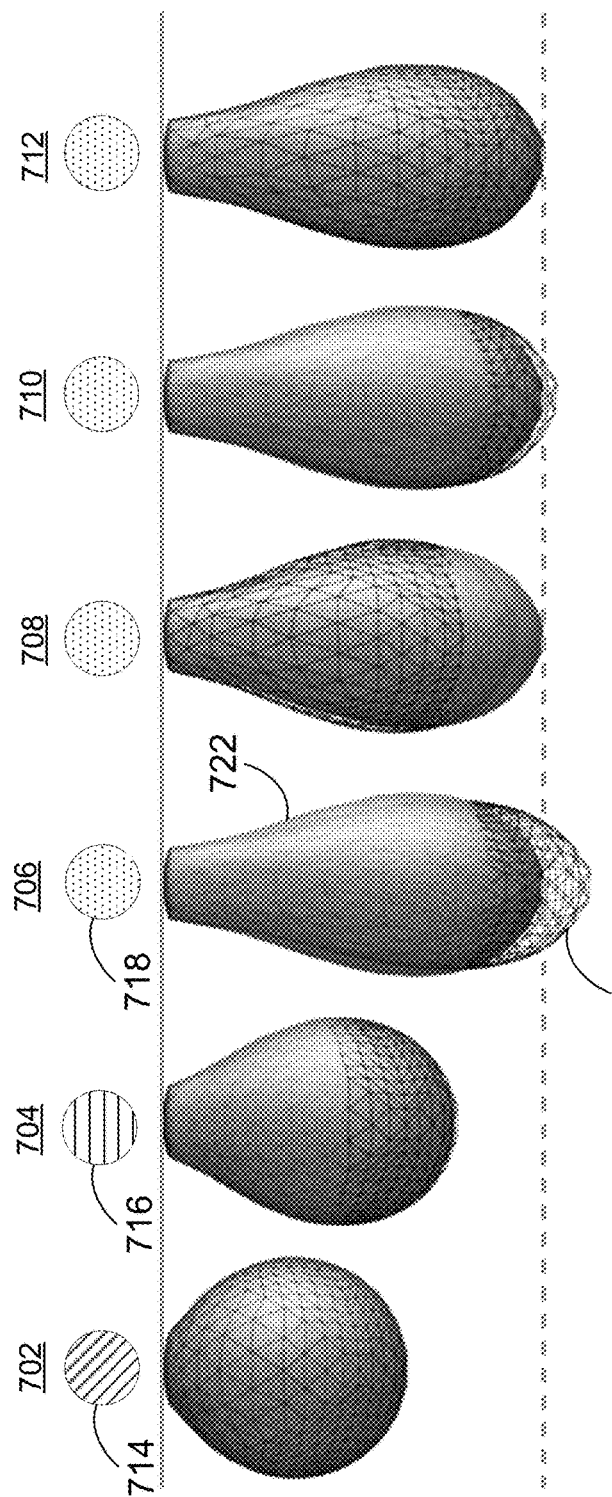
FIG. 7 illustrates effects of changing material parameters of an object over time, in accordance with some examples.
Figure 8:
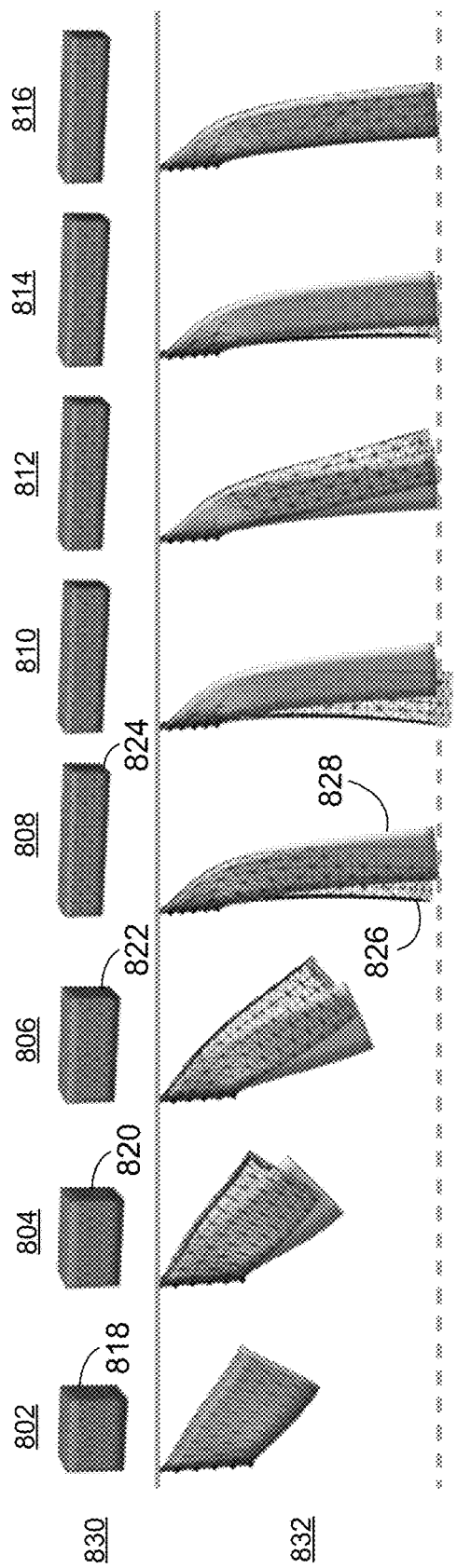
FIG. 8 illustrates effects of changing a rest shape of an object over time, in accordance with some examples.

A central challenge in performing physical simulation is that changes to the rest shape or configuration X, if done naively, will induce spurious forces that can manifest as visually disturbing oscillations, as demonstrated in FIG. 7 and FIG. 8. In order to prevent such artifacts, the model simulation engine 440 can assume that the inertial forces remain invariant when changing the rest shape and can update the deformed volumetric mesh configuration in order to maintain dynamic balance.

In order to formalize this idea, assume that the rest configuration and parameters change from $X_p$ to $X_n$ and from $P_p$ to $P_n$, respectively, as shown in Algorithm 1. A dynamic time step can then be performed at step 5 using the previous configurations $X_p$ (previous rest shape) and $P_p$ (previous material parameters), resulting in intermediate positions $\tilde{x}_n$. For example, the dynamic time step includes calculating $f_{dynamic}(x)$ for the previous configurations $X_p$ and $P_p$, as shown in step 5 of the algorithm 1. The velocities and accelerations are then calculated at step 6. Next, the inertial force $\tilde{f}_{inertial} = Ma_n(\tilde{x}_n)$ is computed at step 7. At this point, the inertial forces are in balance with the elastic forces and other external forces. However, simply updating the rest shape and the material parameters would violate this balance and induce artifacts. For example, if the rest shape of the block shown in FIG. 8 is changed from the short bar shape 818 to the long bar shape 824 (with rest shapes 820 and 822 between), an elastic force will be created to pull the block back to the configuration of the short bar 818, as if the block was stretched in relation to its new rest shape. This additional elastic force is a spurious force that is unwanted.

To prevent such spurious forces, corresponding changes in the deformed configuration (including the changed rest shape and material parameters) are computed by performing a dynamic rebalancing process such that dynamic balance is maintained. For example, the dynamic rebalancing engine 448 can take the volumetric mesh before it is modified, and can compute the inertial forces of the mesh. Then, after the shape and materials of the volumetric mesh are changed, the dynamic rebalancing engine 448 solves for a position of the model, which agrees with the inertia observed before the material and shape were changed. The dynamic rebalancing process can thus be performed to solve for a position of the model that agrees with forces observed before the material and shape of the model were changed. The dynamic rebalancing amounts to solving a statics problem:

$$\tilde{f}_{inertial} + \nabla_x W(X, x_n, P) = f_{ext},  \quad \text{Equation (12)}$$

in order to obtain the final positions $x_n$. In practice, the final positions $x_n$ can be determined by minimizing the objective function:

$$f_{static}(x_n) = x_n^T \tilde{f}_{inertial} + W(X_n, x_n, P_n) - x_n^T f_{ext},  \quad \text{Equation (13)}$$

The proposed update scheme supports changes to both shape and material properties over time without introducing spurious forces. It also guarantees that, in the absence of any external forces, the facial animation will exactly match the input animation as created by the artist.

Finally, in order to handle self-collisions and contact, standard penalties of the form $\frac{1}{2}kd^2$ can be added to the potential W, where d denotes the penetration depth between two intersecting surface triangles, and k is a corresponding stiffness coefficient.

Various implementation details of the above techniques can be used and modified, depending on the application at hand. Details are described on how teeth are treated, how excessive resolution rigs are dealt with, how to minimize the objectives, and how to set material parameters.

Teeth collision surfaces can be added. For example, to prevent the lips from collapsing inwards, teeth-shaped collision surfaces are added and are attached to either the upper or lower bones for correct transformations during posing. To guarantee intersection-free rest shape configurations, these additional internal surfaces can be taken into account when initializing the blendvolume basis, as described above.

Embedded simulation may be performed. Production-level blendshape rigs can collect differential data for 100,000 vertices or more. However, for enriching these rigs with secondary motion effects, this level of detail is excessive and unnecessary. Therefore, the highly detailed surface rigs (50,000-150,000 vertices) can be decimated to a smaller number of vertices (e.g., to about 5,000 vertices). Decimation takes place on the neutral expression $S_0$ and is then propagated to the complete blendshape basis $B_S$ using Laplacian deformation. Simulation and initialization, as described above, are then performed on this embedded rig with up to a certain number of noes (e.g., up to 9,000 nodes). Finally, resulting deformed configurations are mapped back to the high-resolution surface using the low-resolution vertex positions as constraints to a Laplacian system.

Minimization of the objectives can also be performed. To minimize the objectives in Equation (11) and Equation (13), a Newton method can be used with analytical gradients and Hessians. A time step size of 0.0033 seconds can be used, and each iteration of Algorithm 1 can take up to 4 seconds on an Intel Core i7 @ 3.2 GHz machine.

To set the material parameters, a mass density (e.g., of 1100 kg/m$^3$) can be used, the Lame constants in Equation (6) can be set to certain values (e.g., to the values 3000 Pa and 2500 Pa, respectively), and the term can be varies between different values (e.g., between 3000 Pa and 20000 Pa). In some cases, for all human faces, the term $\lambda$ is set to 2500 Pa, and for the Fantasy Creature the term $\lambda$ varies from 1000 Pa to 2500 Pa.

The enrichment technique has been used to add secondary motion effects to a total of three faces of both realistic (e.g., as in FIG. 1 and FIG. 10) and fantasy characters (see FIG. 9 and FIG. 11), in addition to two illustrative examples summarized in FIG. 7 and FIG. 8.

FIG. 7 and FIG. 8 illustrate updating of rest shapes and material parameters. In particular, FIG. 7 illustrates effects of changing material parameters of an object over time, and FIG. 8 illustrates effects of changing a rest shape of an object over time from a rest state 818 to a rest state 824. As shown in FIG. 7 and FIG. 8, rest shape or material updates lead to changes of the elastic potential W and, in turn, induce spurious forces in dynamic simulations if not explicitly prevented, as described above. For example, in FIG. 7, the material is softened or made less stiff from left to right, with the hashed shading 714 being most stiff, the horizontal line shading 716 being less stiff than the hashed shading 714, and the dotted shading 718 being less stiff than the horizontal line shading 716 and the hashed shading 714. Softening the material leads to vertical oscillations if inertial force preservation is not enforced using the dynamic rebalancing process described above. In the illustration of FIG. 7, the wireframe mesh 720 is the result of naive simulation, compared to the shaded object 722 resulting from performance of the dynamic rebalancing process. As shown in the last four columns 706, 708, 710, and 712, the wireframe mesh 720 bounces up and down due to the spurious forces caused by changing the material parameters that are not accounted for, while the shaded object 722 maintains its shape as the material is changed from stiff to soft.

As shown in FIG. 8, a rest shape of an elastic bar is changed over time, as shown in row 830. The rest shape of the elastic bar is elongated from left to right, from a first rest shape 818 in column 802, to a second rest shape 820 in column 804, to a third rest shape 822 in column 806, and to a final rest shape 824 in columns 808-816. The elastic bar shown in row 830 is the rest state of the bar, including the shape of the bar when it is not deformed or under forces. Row 832 shows the bar being deformed by physical simulation under the external force of gravity. As the bar gets longer (as shown in row 830), gravity pulls the bar further down (as shown in row 832). Two illustrations of the deformed bar are shown in row 832, including a wireframe mesh 826 with no dynamic rebalancing applied and the shaded object 828 with dynamic rebalancing applied. As shown, the wireframe mesh 826 undergoes horizontal oscillations and begins to sway back and forth and bounce up and down due to spurious internal forces resulting from the bar being elongated. For example, when the bar is elongated from the rest shape 818 to the rest shape 824, an elastic internal force is created that wants to pull the bar back to the rest shape 818. Because dynamic rebalancing is not performed, these spurious forces are not accounted for. However, the desired result is to not introduce any new, spurious forces when changing the rest shape of the bar, and to keep the only external force of gravity. For example, the bar should only get longer and sag down a little more as the bar is elongated, without wiggling back and forth or oscillating up and down. By performing the dynamic rebalancing described above, the shaded object 828 is only affected by gravity, and is not affected by spurious internal forces resulting from elongating the bar. Another external force that could be applied is inertia (as described above), but there is no inertia in the bar example of FIG. 8 because the bar is static (only gravity is being applied, no other external force such as someone waving the bar around).

Returning to FIG. 1, a neutral expression is illustrated undergoing rapid side-to-side head motion (expression 104) and fast up-down running motion (expressions 106 and 108). The additional secondary dynamics are visible especially in the lip region. Additionally, a smile expression 108 is shown undergoing the same running motion, where the secondary effect is much more subtle due to the stiffened tissue caused by the smile expression.

Figure 10:
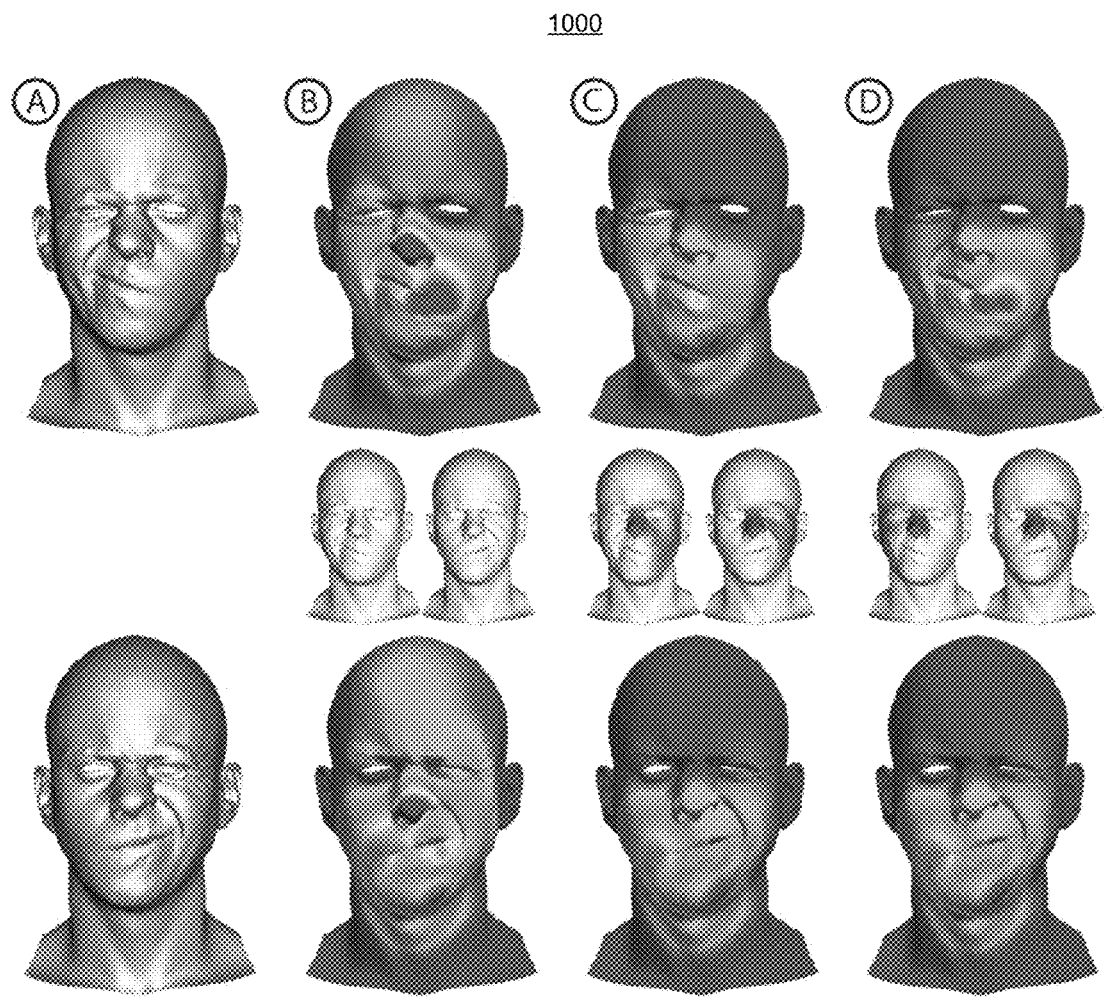
FIG. 10 illustrates animation of a character during a running sequence enhanced with plausible secondary dynamics, in accordance with some examples.

An example of another human character is shown in FIG. 10. For the character shown in FIG. 10, a running sequence is enhanced with facial expressions changing from squinting on a right side (column A, top row) to squinting on the left side (column A, bottom row) with plausible secondary dynamics. The necessity of spatio-temporal material changes is clearly illustrated in columns B-D. For example, column B shows a spatially uniform material and column C shows a spatially-varying, but temporally constant, material. The examples in columns B and C do not lead to physically-plausible effects. For example, when using a homogeneous material (B, middle row), implausibly large deformations in stiff regions of the face are observed and are visualized on the rainbow color maps in the top and bottom rows with small displacements in blue and large displacements in red. If the material is we spatially varied but is kept temporally constant (as in column C), plausible secondary motion is observed for the left squint (column C, bottom row), but not for the right squint (column C, top row). Only when spatio-temporally varying materials are used can the expressiveness needed for the desired effects be achieved, as shown in the illustration of column D. By spatio-temporally varying materials, the desired effects are achieved for both left and right squint expressions (as shown in column D).

Figure 9:
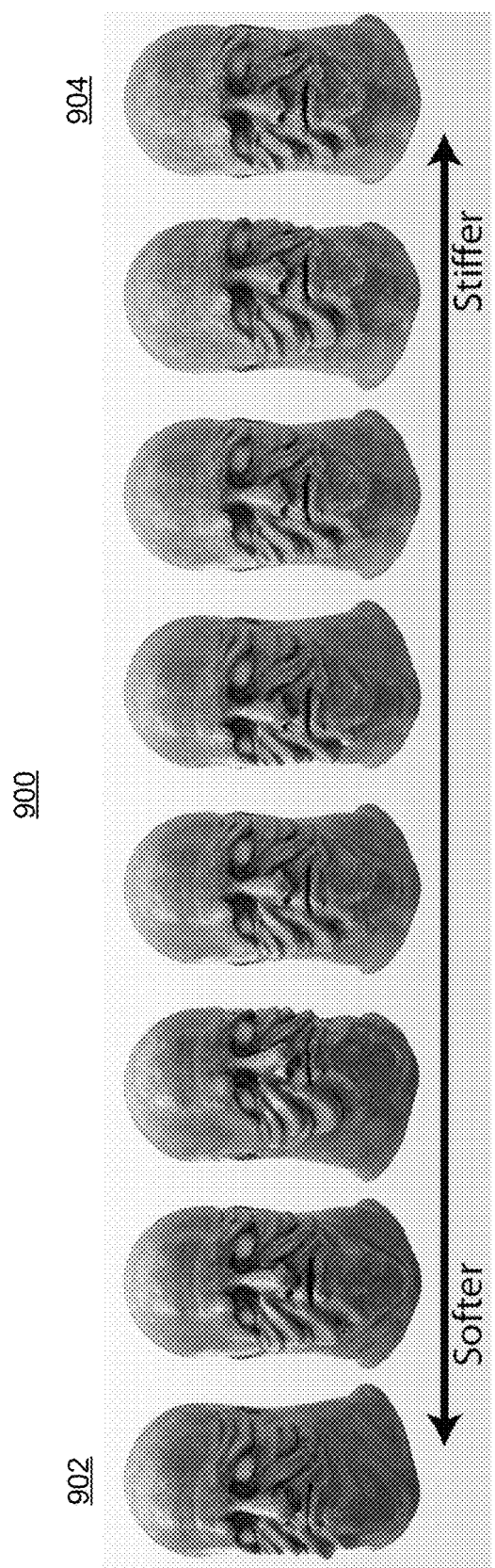
FIG. 9 illustrates animation of a character using blendshapes with added physical simulation to provide dynamic secondary effects, in accordance with some examples.

The techniques disclosed herein can also apply to fantasy characters. For example, to demonstrate the versatility of such techniques, the techniques are applied to the fantasy creature made of mud shown in FIG. 9. In FIG. 9, extreme rest shape, volume, and stiffness changes are shown. Shapes and materials change from a "wet and soft" state in illustration 902 to a "dry and stiff" state in illustration 904. The volume and material drastically shrink and stiffen during a rapid head-shaking sequence by the character.

Figure 11:
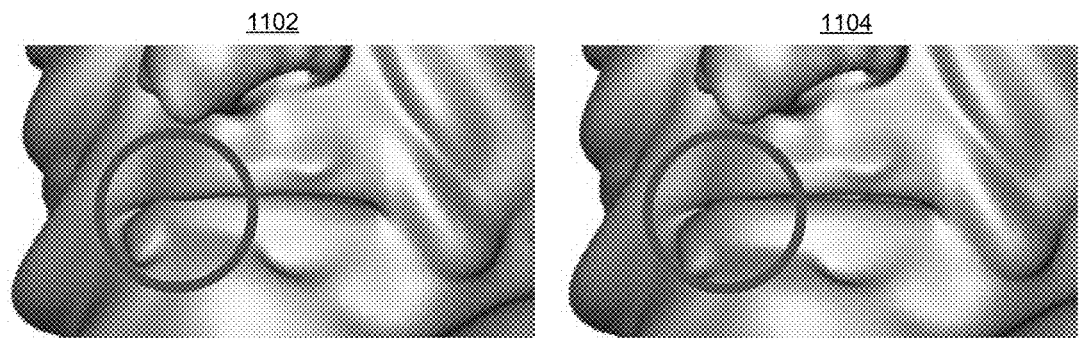
FIG. 11 illustrates an example of correction of self-collisions, in accordance with some examples.

Furthermore, handling contact and collisions can be an integral component of the techniques described herein. As illustrated in FIG. 11, the techniques are capable of correcting lip self-collisions as well as handling other contacts, constraining secondary motion effects to the physically feasible set, as described above. Contact and collision handling is shown in FIG. 11 as a self-collision of the upper and lower lip. The picture 1102 includes no collision handling, in which case a self-intersection in proximity of the lip corner is observed. The picture 1102 includes collision handling, in which case the lip corner intersection is correctly resolved when collision handling is active.

Using the systems and methods described herein, physical simulation is added to traditional blendshape rigs. As an alternative to complex muscle-based anatomical models, basic artist directed animation is combined with the benefits of physical simulation for creating secondary motion. Included in such techniques is an adaptation of the rest shape during simulation, according to the input animation, without inducing unwanted forces. This ensures that, in the absence of external forces, the result will match the input animation. Furthermore, an approach is introduced to allow spatio-temporally changing material parameters during simulation, in order to account for locally changing tissue stiffness caused by muscle activation. The framework is very simple and intuitive to control, as defining expression-dependent material parameters can include painting on the blendshape geometry. As a result, the systems and methods add realistic physical effects to facial animations.

Figure 12:
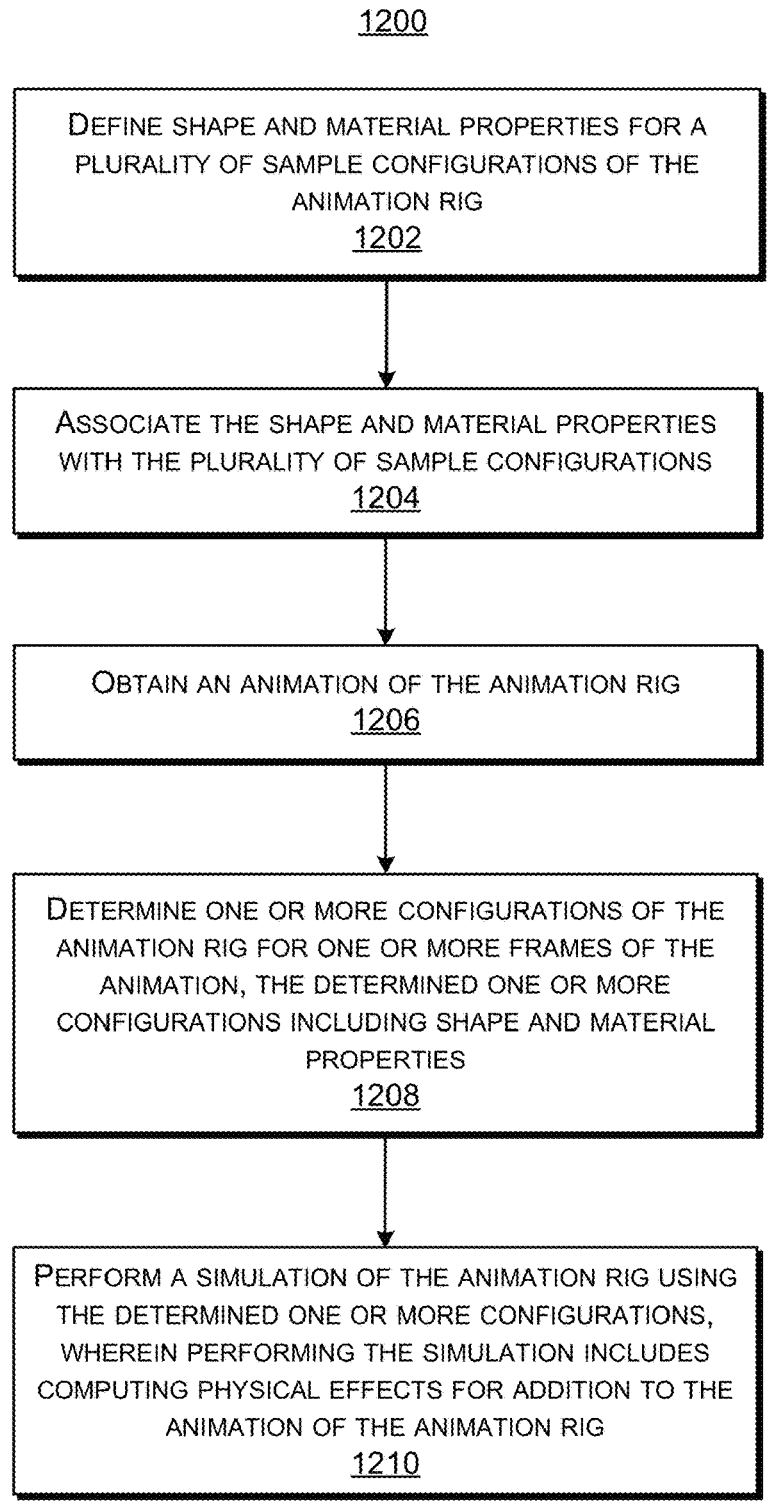
FIG. 12 illustrates an example of a process of generating a physical model, in accordance with some examples.

FIG. 12 illustrates an example of a process 1200 of determining time-varying anatomical and physiological tissue characteristics of an animation rig. Process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 1200 may be performed by a computing device, such as the model generation engine 330 and/or the model simulation engine 440 shown in FIG. 3 and FIG. 4, respectively. In some examples, the model generation engine 330 and/or the model simulation engine 440 can be implemented by the computer system 1300 shown in FIG. 13.

At block 1202, the process 1200 includes defining shape and material properties for a plurality of sample configurations of the animation rig. For example, as described above, a blend-volume basis of a volumetric mesh can be created with direct shape correspondence with a blendshape subspace. Further, as described above, spatially-varying per-expression material parameters can be determined and can make up a blend material rig. In some examples, a sample configuration of the animation rig can include a corresponding pose S or expression (e.g., based on a combination of blendshapes).

At block 1204, the process 1200 includes associating the shape and material properties with the plurality of sample configurations. For example, each sample configuration of the animation rig can be associated with a corresponding combination of shape properties (e.g., based on blendvolumes, such as a rest state geometry X for that configuration) and blend material properties (e.g., based on a blend element parameters P).

At block 1206, the process 1200 includes obtaining an animation of the animation rig. For example, a plurality of frames making up the animation may be received. In some examples, an expression of a subject in each frame can be defined by a corresponding configuration of the animation rig, which may include a corresponding pose S based on a combination of blendshapes.

At block 1208, the process 1200 includes determining one or more configurations of the animation rig for one or more frames of the animation. For example, a corresponding configuration of the animation rig can be determined for each frame. The determined one or more configurations include shape and material properties. The one or more configurations are determined using one or more sample configurations of the animation rig. For example, a determined configuration includes the shape properties (e.g., the rest state geometry X) and material properties (e.g., the blend element parameters P) associated with that configuration.

At block 1210, the process 1200 includes performing a simulation of the animation rig using the determined one or more configurations. Performing the simulation includes computing physical effects for addition to the animation of the animation rig. An example of the simulation is shown by Algorithm 1 above.

In some examples, the process 1200 includes changing, at each frame of the animation, a rest state configuration for the simulation to be an interpolation of a corresponding configuration determined for each frame. For example, as described above, the rest state can be adapted according to the obtained animation. Adapting the rest state (or rest shape) ensures that, in the absence of external forces (e.g., head motion, gravity, external physical movement of the object, or other external forces), the equilibrium states of the simulation coincide with the pre-defined blendshape poses. Referring to Algorithm 1, the rest state can be implicitly updated at step 8 (Solve $x_n = \mathrm{argmin}_x f_{static}(x)$).

In some examples, the process 1200 includes performing dynamic rebalancing to prevent changing rest state configurations from affecting the simulation. For example, performing the dynamic rebalancing for a frame can include determining a force associated with one or more shapes of the animation rig for the frame. The force is determined before a rest state configuration of the simulation is changed at the frame. Performing the dynamic rebalancing for the frame can further include determining, for the frame, a configuration that satisfies the determined force. The force can include an inertial force, or any other suitable force.

In some examples, the animation rig includes a blendshape rig. In such examples, the plurality of sample configurations correspond to a blendshape basis. In some examples, the animation rig also includes a blendvolume rig. The blendvolume rig includes a plurality of blendvolumes defining volumetric structures for complementing the blendshape rig. In some examples, the plurality of blendvolumes are generated by deforming a neutral blendvolume to each of a plurality of blendshapes. In one illustrative example, the neutral blendvolume is generated by tesselating or tetrahedralizing a neutral blendshape.

In some examples, computing the physical effects includes determining a blendvolume of the blendvolume rig for a configuration of the animation rig. The determined blendvolume comprises a combination of blend elements defining a volumetric structure of the configuration. In such examples, computing the physical effects further includes determining one or more material properties of the configuration.

In some examples, the process 1200 includes adding the shape and material properties of the determined one or more configurations to the animation of the animation rig. By adding the shape and material properties to the animation (e.g., including the blendshape animation), a layer of physical simulation (including anatomical and physiological tissue characteristics) is added on top of the input animation sequence.

Figure 13:
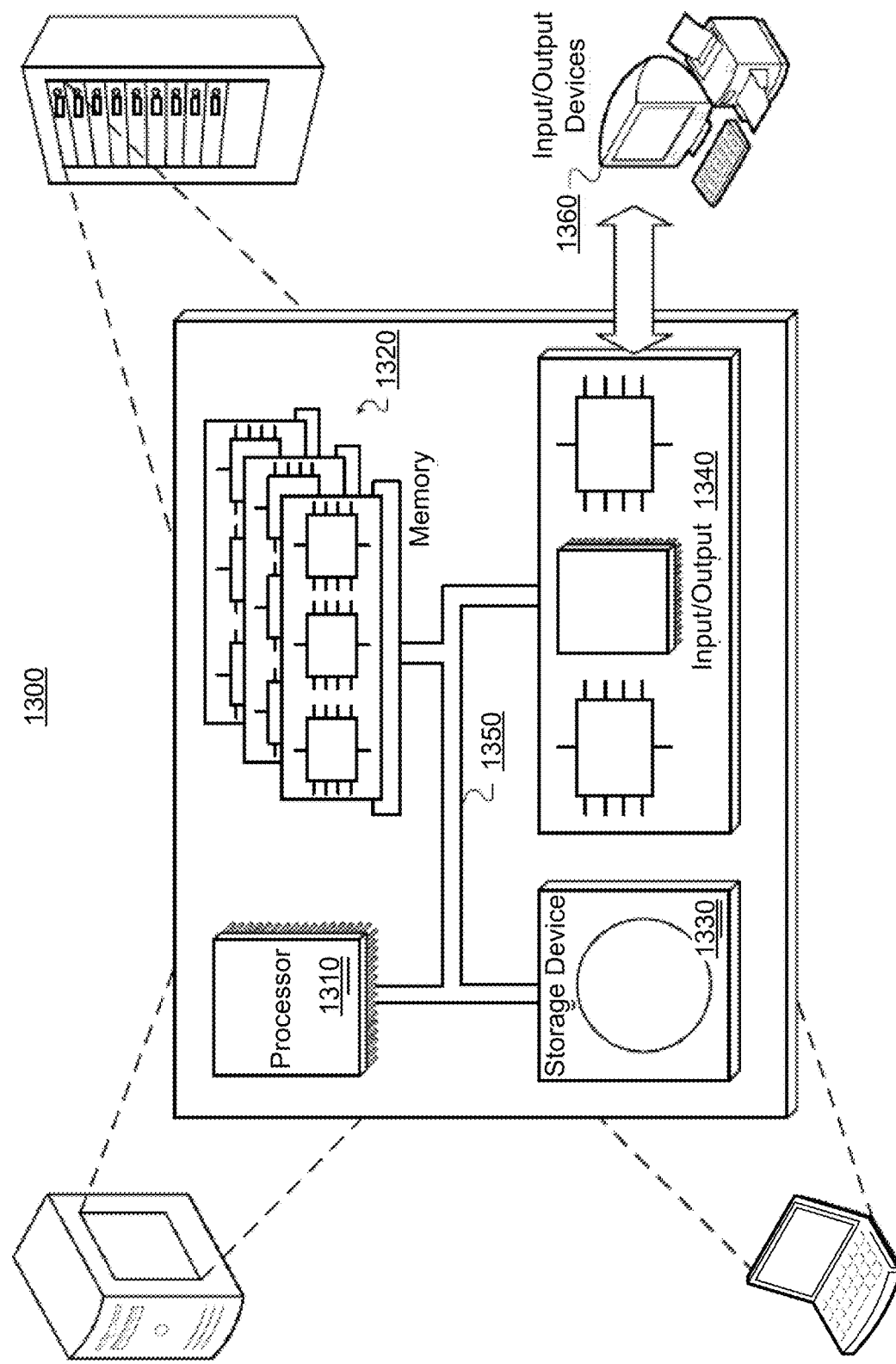
FIG. 13 shows an example of a computer system that may be used in various embodiments of the application.

Referring to FIG. 13, a schematic diagram is shown of an example of a computer system 1300. This system is exemplary only and one having skill in the art will recognize that variations and modifications are possible. The system 1300 can be used for the operations described above. For example, the computer systems shown in FIG. 13 may be used to implement any or all of the initialization (e.g., face annotation, skull fitting, constraint creation) and stabilization (e.g., skin energy or error determination, nose energy or error determination) techniques and routines described herein.

The system 1300 includes a processor 1310, a memory 1320, a storage device 1330, and an input/output interface 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to provide graphical information via input/output interface 1340 for display on a user interface of one or more input/output device 1360.

The memory 1320 stores information within the system 1300 and may be associated with various characteristics and implementations. For example, the memory 1320 may include various types of computer-readable medium such as volatile memory, a non-volatile memory and other types of memory technology, individually or in combination.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1360 provides input/output operations for the system 1300. In one implementation, the input/output device 1360 includes a keyboard and/or pointing device. In another implementation, the input/output device 1360 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of determining time-varying anatomical and physiological tissue characteristics of an animation rig, comprising:
   defining shape and material properties for a plurality of sample configurations of the animation rig, the animation rig comprising a blendshape rig and a blendvolume rig, the blendvolume rig including a plurality of blendvolumes defining volumetric structures for complementing the blendshape rig;
   associating the shape and material properties with the plurality of sample configurations on a blendshape basis;
   obtaining an animation of the animation rig;
   determining one or more configurations of the animation rig for one or more frames of the animation, the determined one or more configurations including shape and material properties, wherein the one or more configurations are determined using one or more sample configurations of the animation rig; and
   performing a simulation of the animation rig using the determined one or more configurations, wherein performing the simulation includes computing physical effects for addition to the animation of the animation rig.

2. The method of claim 1, further comprising:
changing, at each frame of the animation, a rest state configuration for the simulation to be an interpolation of a corresponding configuration determined for each frame.

3. The method of claim 2, further comprising:
performing dynamic rebalancing to prevent changing rest state configurations from affecting the simulation.

4. The method of claim 3, wherein performing the dynamic rebalancing for a frame includes:
determining a force associated with one or more shapes of the animation rig for the frame, wherein the force is determined before a rest state configuration of the simulation is changed at the frame; and
determining, for the frame, a configuration that satisfies the determined force.

5. The method of claim 1, wherein computing the physical effects includes:
determining a blendvolume of the blendvolume rig for a configuration of the animation rig, the blendvolume comprising a combination of blend elements defining a volumetric structure of the configuration; and
determining one or more material properties of the configuration.

6. The method of claim 1 wherein the plurality of blendvolumes are generated by deforming a neutral blendvolume to each of a plurality of blendshapes.

7. The method of claim 6, wherein the neutral blendvolume is generated by tesselating a neutral blendshape.

8. The method of claim 1, further comprising:
adding the shape and material properties of the determined one or more configurations to the animation of the animation rig.

9. A computer-readable memory storing a plurality of instructions executable by one or more processors, the plurality of instructions comprising instructions that cause the one or more processors to:
define shape and material properties for a plurality of sample configurations of an animation rig, the animation rig comprising a blendshape rig and a blendvolume rig, the blendvolume rig including a plurality of blendvolumes defining volumetric structures for complementing the blendshape rig;
associate the shape and material properties with the plurality of sample configurations on a blendshape basis;
obtain an animation of the animation rig;
determine one or more configurations of the animation rig for one or more frames of the animation, the determined one or more configurations including shape and material properties, wherein the one or more configurations are determined using one or more sample configurations of the animation rig; and
perform a simulation of the animation rig using the determined one or more configurations, wherein performing the simulation includes computing physical effects for addition to the animation of the animation rig.

10. The computer-readable memory of claim 9, further comprising instructions that cause the one or more processors to:
change, at each frame of the animation, a rest state configuration for the simulation to be an interpolation of a corresponding configuration determined for each frame.

11. The computer-readable memory of claim 10, further comprising instructions that cause the one or more processors to:
perform dynamic rebalancing to prevent changing rest state configurations from affecting the simulation.

12. The computer-readable memory of claim 11, wherein performing the dynamic rebalancing for a frame includes:
determining a force associated with one or more shapes of the animation rig for the frame, wherein the force is determined before a rest state configuration of the simulation is changed at the frame; and
determining, for the frame, a configuration that satisfies the determined force.

13. The computer-readable memory of claim 9, wherein computing the physical effects includes:
determining a blendvolume of the blendvolume rig for a configuration of the animation rig, the blendvolume comprising a combination of blend elements defining a volumetric structure of the configuration; and
determining one or more material properties of the configuration.

14. The computer-readable memory of claim 9, wherein the plurality of blendvolumes are generated by deforming a neutral blendvolume to each of a plurality of blendshapes.

15. The computer-readable memory of claim 9, further comprising instructions that cause the one or more processors to:
add the shape and material properties of the determined one or more configurations to the animation of the animation rig.

16. A system for determining time-varying anatomical and physiological tissue characteristics of an animation rig, comprising:
a memory storing a plurality of instructions; and
one or more processors configurable to:
define shape and material properties for a plurality of sample configurations of the animation rig, the animation rig comprising a blendshape rig and a blendvolume rig, the blendvolume rig including a plurality of blendvolumes defining volumetric structures for complementing the blendshape rig;
associate the shape and material properties with the plurality of sample configurations on a blendshape basis;
obtain an animation of the animation rig;
determine one or more configurations of the animation rig for one or more frames of the animation, the determined one or more configurations including shape and material properties, wherein the one or more configurations are determined using one or more sample configurations of the animation rig; and
perform a simulation of the animation rig using the determined one or more configurations, wherein performing the simulation includes computing physical effects for addition to the animation of the animation rig.

* * * * *